United States Patent
Wu

(10) Patent No.: US 10,311,001 B2
(45) Date of Patent: Jun. 4, 2019

(54) ELECTRONIC DEVICE AND COMMUNICATION METHOD THEREOF

(71) Applicant: GETAC TECHNOLOGY CORPORATION, Hsinchu County (TW)

(72) Inventor: Ming-Zong Wu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 15/728,484

(22) Filed: Oct. 9, 2017

(65) Prior Publication Data

US 2019/0108153 A1 Apr. 11, 2019

(51) Int. Cl.
| | |
|---|---|
| G06F 13/38 | (2006.01) |
| G06F 13/42 | (2006.01) |
| G06F 13/40 | (2006.01) |
| G06F 1/3287 | (2019.01) |
| G06F 11/22 | (2006.01) |
| G06F 11/267 | (2006.01) |
| G06F 1/26 | (2006.01) |

(52) U.S. Cl.
CPC ............ *G06F 13/385* (2013.01); *G06F 1/266* (2013.01); *G06F 1/3287* (2013.01); *G06F 11/221* (2013.01); *G06F 11/267* (2013.01); *G06F 13/4022* (2013.01); *G06F 13/4282* (2013.01); *G06F 2213/0042* (2013.01); *G06F 2213/3812* (2013.01)

(58) Field of Classification Search
CPC ...... G06F 13/385; G06F 1/266; G06F 1/3287; G06F 11/221; G06F 11/267; G06F 13/4022; G06F 13/4282

USPC .................................................. 713/300–340
See application file for complete search history.

(56) References Cited

U.S. PATENT DOCUMENTS

| | | | | | |
|---|---|---|---|---|---|
| 5,123,015 | A | * | 6/1992 | Brady, Jr. ........ | B64D 11/00155 370/539 |
| 5,673,276 | A | * | 9/1997 | Jarwala .......... | G01R 31/318513 324/762.06 |
| 6,125,464 | A | * | 9/2000 | Jin .................. | G01R 31/318572 714/724 |
| 6,438,720 | B1 | * | 8/2002 | Boutaud ................. | G06F 11/24 714/724 |

(Continued)

OTHER PUBLICATIONS

On-The-Go and Embedded Host Supplement to the USB Revision 3.0 Specification Revision 1.1 May 10, 2012 (Year: 2012).*

*Primary Examiner* — Paul R. Myers

(57) ABSTRACT

An electronic device includes a case containing a universal serial bus (USB) transmission port, an embedded control unit, a central processing unit, a power supply unit and a multiplex control unit. The multiplex control unit has a first usage mode and a second usage mode. The multiplex control unit is normally in the first usage mode, and switches to the second usage mode when a switch signal is received. In the first usage mode, the multiplex control unit is powered by the power supply unit, and the multiplex control unit builds up a first transmission path between the central control unit and the USB transmission port. In the second usage mode, the multiplex control unit is powered by an external device connected to the USB transmission port, and the multiplex control unit builds up a second transmission path between the embedded control unit and the USB transmission port.

11 Claims, 7 Drawing Sheets

(56) References Cited

U.S. PATENT DOCUMENTS

| | | | | |
|---|---|---|---|---|
| 6,494,616 | B1* | 12/2002 | Tokhtuev | G01D 3/02 340/870.11 |
| 8,683,085 | B1* | 3/2014 | Castleberry | G06F 13/385 710/14 |
| 8,738,952 | B1* | 5/2014 | Lachwani | G06F 1/3287 710/100 |
| 8,762,746 | B1* | 6/2014 | Lachwani | G06F 1/266 713/300 |
| 9,811,488 | B2* | 11/2017 | Moore | G06F 13/426 |
| 2005/0204072 | A1* | 9/2005 | Nakagawa | H04L 12/40136 710/8 |
| 2006/0080490 | A1* | 4/2006 | Tang | G06F 13/385 710/313 |
| 2006/0106962 | A1* | 5/2006 | Woodbridge | G06F 13/4291 710/106 |
| 2007/0239924 | A1* | 10/2007 | Foo | G06F 13/385 710/316 |
| 2008/0133802 | A1* | 6/2008 | Nagamine | G06F 13/4282 710/63 |
| 2008/0148214 | A1* | 6/2008 | Yancey | G06F 17/5054 716/103 |
| 2008/0178011 | A1* | 7/2008 | Hubo | G06F 1/3209 713/300 |
| 2011/0060923 | A1* | 3/2011 | Hoffer | G06F 1/3203 713/300 |
| 2011/0162043 | A1* | 6/2011 | Sakai | G06F 1/26 726/3 |
| 2012/0076231 | A1* | 3/2012 | Mateman | H03K 23/665 375/295 |
| 2012/0269193 | A1* | 10/2012 | Guo | H04L 49/35 370/389 |
| 2014/0101345 | A1* | 4/2014 | Ranta | G06F 11/3051 710/16 |
| 2014/0181350 | A1* | 6/2014 | Pedro | G06F 13/4072 710/313 |
| 2016/0054786 | A1* | 2/2016 | Chenault | G06F 1/3212 710/313 |
| 2017/0192916 | A1* | 7/2017 | Luo | G06F 13/385 |
| 2018/0011528 | A1* | 1/2018 | Srivastava | G06F 1/3215 |

* cited by examiner

ELECTRONIC DEVICE AND COMMUNICATION METHOD THEREOF

FIELD OF THE INVENTION

The present invention relates to electronic devices and, more particularly, to an electronic device and a communication method thereof, including a universal serial bus (USB) port which functions as a multifunction connection interface.

DESCRIPTION OF THE PRIOR ART

Conventional customized, small-sized product designs not only feature a debug/programming interface dedicated to a hardware circuit disposed in an electronic device, but also feature a port disposed on a printed circuit board (PCB) and adapted for connection with a testing/programming device, with a view to allowing researchers to debug and design the hardware circuit directly through the port during the programming stage of the electronic device.

Sometimes conventional customized, small-sized product designs require that, upon completion of assembly of the electronic device, the port disposed on the PCB should be hermetically sealed by a case of the electronic device. As a result, to perform a debug/programming test on the hardware circuit through the port disposed on the PCB after the electronic device has been delivered, it is necessary to remove the case of the electronic device. However, the removal of the case of the electronic device entails carrying out a procedure which is intricate, especially in the intractable situation where the case encapsulates entirely, and thus cannot be removed from, the electronic device. Furthermore, the removal of the case from the electronic device is likely to cause water leakage to the electronic device, disfigure the electronic device, and undermine the functions of the electronic device.

Sometimes conventional customized, small-sized product designs feature an access opening optionally disposed on the case of the electronic device so that a testing/programming device is connected to the port through the access opening. However, the access opening not only reduces the beauty of the case of the electronic device but also adds to the complexity of waterproofing the case of the electronic device.

SUMMARY OF THE INVENTION

In an embodiment, an electronic device comprises a case, a universal serial bus (USB) port, an embedded control unit, a central processing unit, a power supply unit and a multiplex control unit. The USB port is disposed at the case. The embedded control unit, central processing unit, power supply unit and multiplex control unit are disposed in the case. The multiplex control unit has a first usage mode and a second usage mode. The multiplex control unit is normally in the first usage mode but switches to the second usage mode upon receipt of a switch signal. In the first usage mode, the multiplex control unit is powered by the power supply unit and creates a first transmission path between the central processing unit and the USB port. In the second usage mode, the multiplex control unit is powered by an external device connected to the USB port and creates a second transmission path between an embedded control unit and the USB port.

In an embodiment, a communication method applicable to an electronic device comprises the steps of: connecting a universal serial bus (USB) port of the electronic device to an external device; receiving by a multiplex control unit of the electronic device power from the external device through the USB port when the electronic device is in an OFF state; and creating a transmission path between the USB port and an embedded control unit by the multiplex control unit according to a switch signal while being supplied with power.

In an embodiment, a communication method applicable to an electronic device comprises the steps of: connecting a first data multiplexer of the electronic device to a second data multiplexer, followed by creating a transmission path between a universal serial bus (USB) port of the electronic device and a central processing unit with the second data multiplexer by a first connection technology; and creating the transmission path between the USB port and the central processing unit with the second data multiplexer by a second connection technology according to a switch signal.

In conclusion, an electronic device and a communication method thereof according to embodiments of the present invention involve using a multiplex control unit to switch between transmission paths of a USB port so that researchers directly connect an external device to the electronic device to perform a debug/programming test on an embedded control unit and/or a central processing unit in conjunction with the USB port for use with external transmission data so that programming design, maintenance, service and analysis of the electronic device are carried out quickly, conveniently, and reliably.

The features and advantages of the present invention are detailed hereinafter with reference to the preferred embodiments. The detailed description is intended to enable persons skilled in the art to gain insight into the technical contents disclosed herein and implement the present invention accordingly. In particular, persons skilled in the art can easily understand the objectives and advantages of the present invention by referring to the disclosure of the specification, the claims, and the accompanying drawings.

DETAILED DESCRIPTION OF THE EMBODIMENTS

Figure 1:
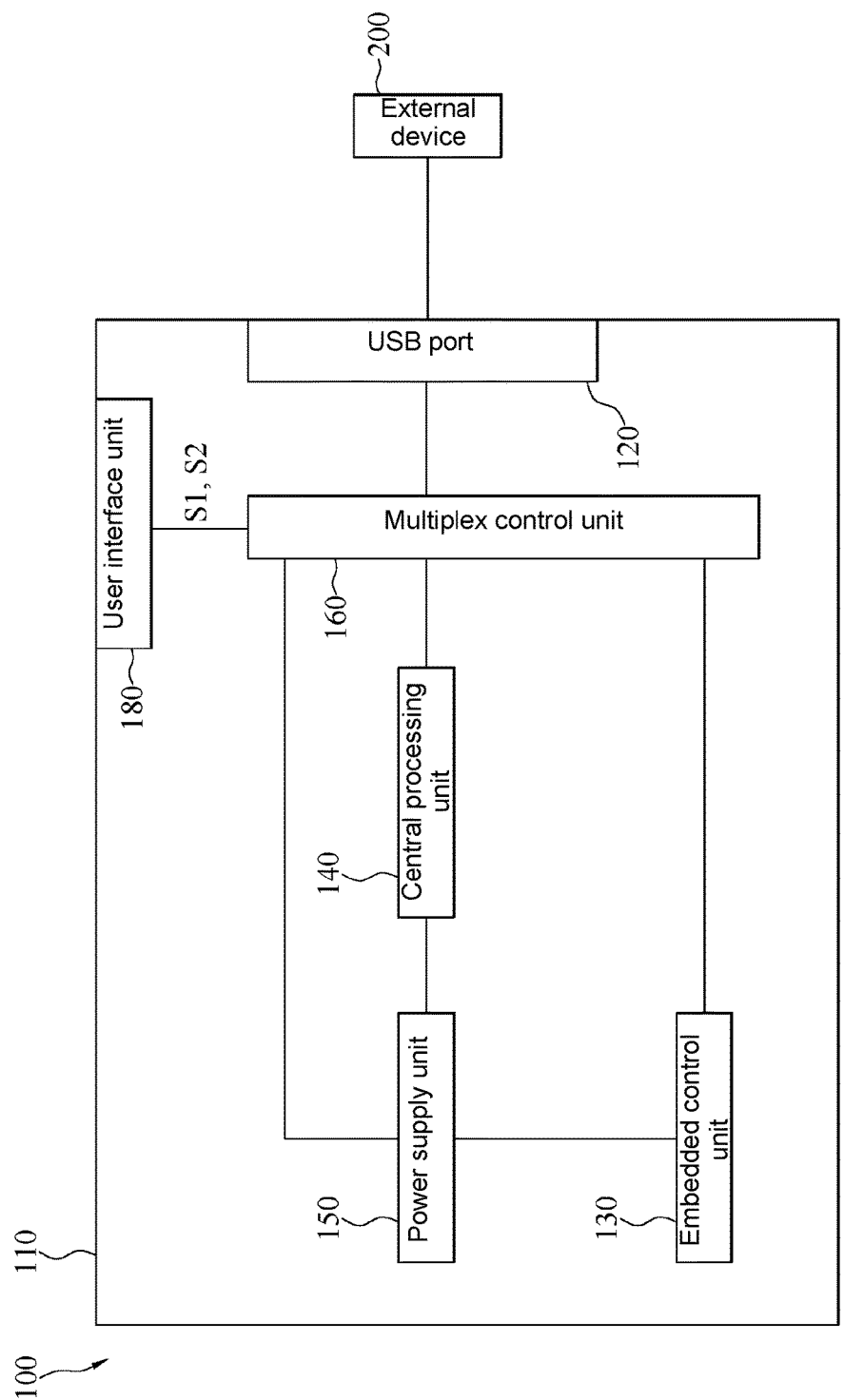
FIG. 1 is a block diagram of an electronic device according to a first embodiment of the present invention.

FIG. 1 is a block diagram of an electronic device according to a first embodiment of the present invention. Referring to FIG. 1, an electronic device 100 comprises a case 110, a universal serial bus (USB) port 120, an embedded control unit 130, a central processing unit 140, a power supply unit 150 and a multiplex control unit 160. The power supply unit 150 is coupled to the embedded control unit 130 and the central processing unit 140. The multiplex control unit 160 is coupled to the central processing unit 140, the power supply unit 150 and the USB port 120.

The USB port 120 is disposed at the case 110. The USB port 120 connects with an external device 200 which has a port corresponding in position to the USB port 120 to allow communication between the external device 200 and the electronic device 100. In some embodiments, the USB port 120 operates by USB 2.0 connection technology or USB 3.0 connection technology. The external device 200 is not only plugged and thereby connected to the USB port 120 of the electronic device 100 but is also unplugged and thereby disconnected from the USB port 120 of the electronic device 100, but the present invention is not limited thereto.

The embedded control unit 130 is disposed in the case 110. The embedded control unit 130 carries out specific tasks in order to perform specific functions of the electronic device 100. For instance, the embedded control unit 130 carries out specific tasks by controlling a peripheral device connected to the electronic device 100 or controlling another circuit disposed in the electronic device 100 so that the electronic device 100 achieves or presents specific functions.

In some embodiments, the embedded control unit 130 is an embedded controller (EC), a super I/O chip or any other appropriate embedded circuit, but the present invention is not limited thereto.

The central processing unit 140 is disposed in the case 110. The central processing unit 140 has diverse, important functions, for example, taking care of the operation of components of the electronic device 100, mathematical computations, and logical computation; hence, the central processing unit 140 is the core circuit of the electronic device 100. In some embodiments, the central processing unit 140 is a central processing unit (CPU), a microprocessor, or a core circuit which has various operational functions.

The power supply unit 150 is disposed in the case 110. The power supply unit 150 receives and stores power; and the power thus stored is one of power sources for driving the operation of the electronic device 100.

In an embodiment, the power supply unit 150 keeps supplying power to the embedded control unit 130 to maintain the operation of the embedded control unit 130, regardless of whether the electronic device 100 is in an ON state or an OFF state. Therefore, when the electronic device 100 is in the OFF state, the embedded control unit 130 waits for a start command. Upon receipt of the start command, the embedded control unit 130 causes the power supply unit 150 to supply power to the USB port 120, central processing unit 140 and multiplex control unit 160 so that the electronic device 100 enters the ON state. Upon receipt of a shutdown command, the embedded control unit 130 causes the power supply unit 150 to stop supplying power to the USB port 120, central processing unit 140 and multiplex control unit 160 so that the electronic device 100 enters the OFF state.

In some embodiments, the power supply unit 150 is a battery of any type or any other appropriate power-storing component.

The multiplex control unit 160 is disposed in the case 110. The multiplex control unit 160 controls transmission paths between the USB port 120 and any other circuit in the electronic device 100.

Figure 2:
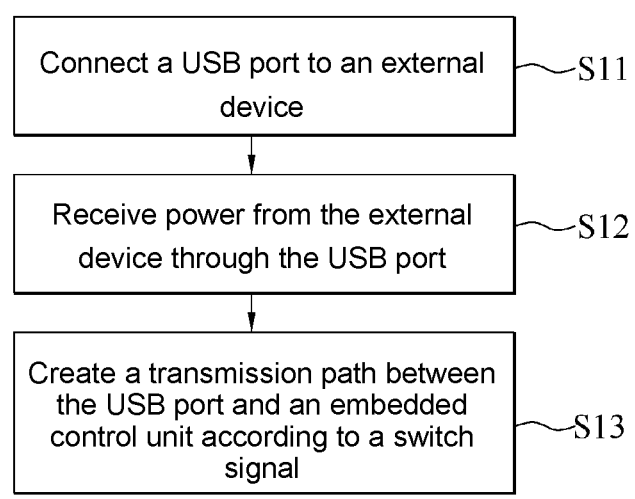
FIG. 2 is a schematic view of the process flow of a communication method according to an embodiment of the present invention.

FIG. 2 is a schematic view of the process flow of a communication method according to an embodiment of the present invention. Referring to FIG. 1 and FIG. 2, in an embodiment of the communication method, the electronic device 100 uses the USB port 120 to connect with the external device 200 (step S11). When the electronic device 100 is in the OFF state, the electronic device 100 receives power from the external device 200 through the USB port 120 (step S12). Then, supplied with power from the external device 200, the electronic device 100 uses the multiplex control unit 160 to create a transmission path between the USB port 120 and the embedded control unit 130 according to a switch signal S1 (step S13).

In an embodiment of step S13, the multiplex control unit 160 has two usage modes (hereinafter referred to as the first usage mode and the second usage mode.) The multiplex control unit 160 is normally in the first usage mode but switches from the first usage mode to the second usage mode upon receipt of the switch signal S1.

In the first usage mode, the multiplex control unit 160 creates a first transmission path between the central processing unit 140 and the USB port 120 to allow the external device 200 to connect with the USB port 120 and thereby undergo unidirectional or bidirectional communication with the central processing unit 140 through the first transmission path. In this regard, the USB port 120 serves as a general, universal port.

In the second usage mode, the multiplex control unit 160 creates a second transmission path between the embedded control unit 130 and the USB port 120 to allow the external device 200 to connect with the USB port 120 and thereby undergo unidirectional or bidirectional communication with the embedded control unit 130 through the second transmission path. In this regard, the USB port 120 serves as a port for use in a debug/programming test.

In an embodiment, the second usage mode of the multiplex control unit 160 is available only when the electronic device 100 is in the OFF state for two reasons: prevent a user from performing, while the electronic device 100 is in the ON state, a wrong switch which otherwise prevents the USB port 120 from serving as a general, universal port; and allow researchers to perform a debug/programming test on the embedded control unit 130 in the electronic device 100 by the USB port 120 without actuating the electronic device 100 to boot an operating system.

In the OFF state, the power supply unit 150 of the electronic device 100 does not supply power to the USB port 120, central processing unit 140 and multiplex control unit 160. In order for a debug/programming test to be carried out, it is necessary for the external device 200 to supply power to the multiplex control unit 160 through the USB port 120 so that the multiplex control unit 160 switches to the second usage mode according to the switch signal S1 and turns on the second transmission path, thereby allowing the external device 200 to communicate with the embedded control unit 130 by the second transmission path.

In an embodiment, the electronic device 100 further comprises a user interface unit 180. The user interface unit 180 is disposed in the case 110. The user interface unit 180 is coupled to the multiplex control unit 160. The user interface unit 180 generates the switch signal S1 according to a user's input.

In some embodiments, the user interface unit 180, which is a mechanical switch component or a button component, generates the switch signal S1 in accordance with the user's action, such as a switch and a press, but the present invention is not limited thereto. In some other embodiments, the user interface unit 180 is a keyboard, and the user presses a specific key on the keyboard or a specific combination of keys on the keyboard to generate the switch signal S1.

In an embodiment, the multiplex control unit 160 switches back to the first usage mode according to a switch signal S2 generated from the user interface unit 180, but the present invention is not limited thereto. In another embodiment, the multiplex control unit 160 is reset and switches back to the first usage mode as soon as the electronic device 100 reenters the ON state.

Figure 3:
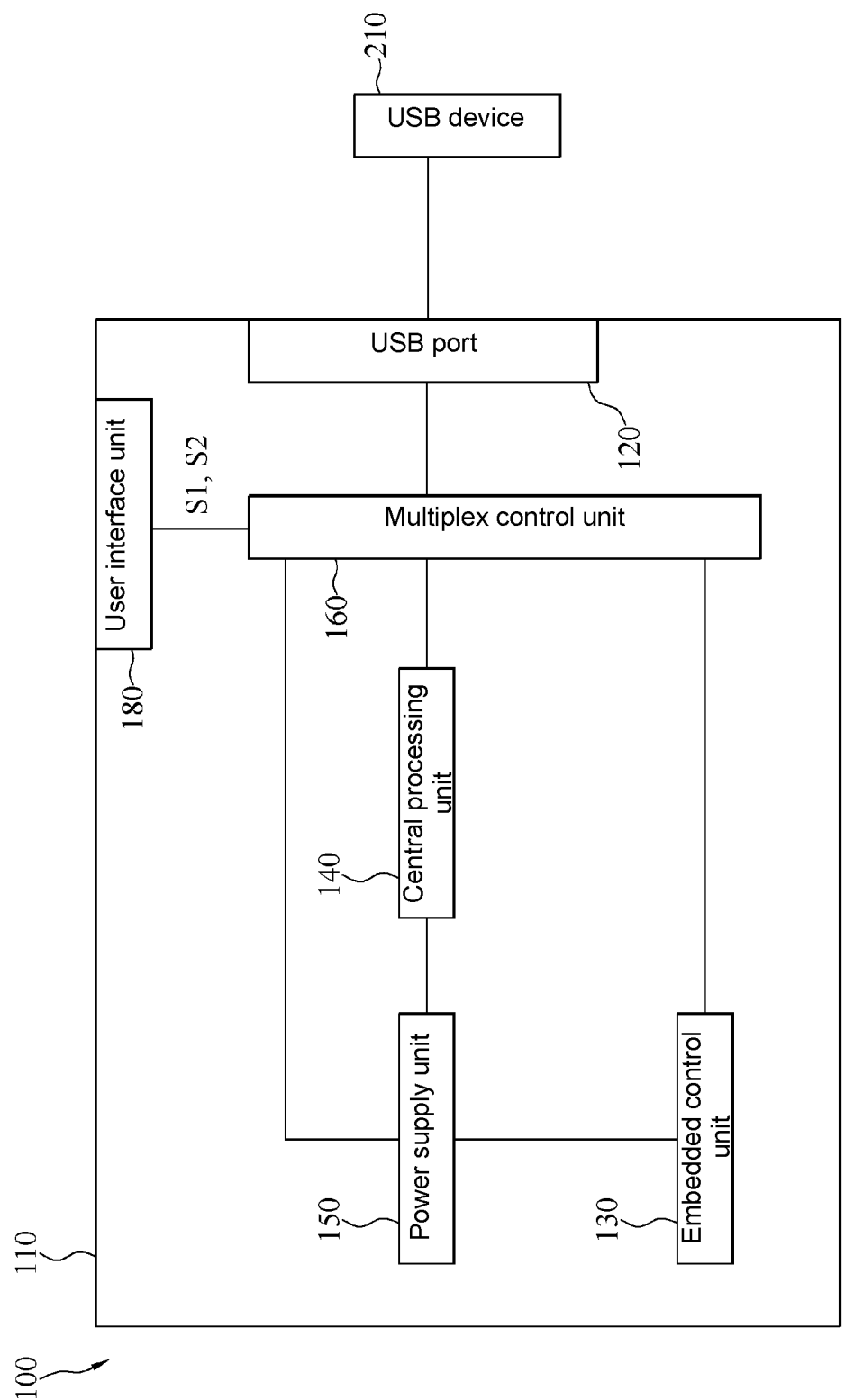
FIG. 3 is a block diagram of a USB port shown in FIG. 1 and adapted to serve as a general, universal port according to an embodiment of the present invention.

FIG. 3 is a block diagram of the USB port shown in FIG. 1 and adapted to serve as a general, universal port according to an embodiment of the present invention. Referring to FIG. 3, the external device 200 is a USB device 210. In an embodiment, the USB device 210 is a USB flash drive, an external hard disk drive, a cell phone or a computer host. The multiplex control unit 160 creates a first transmission path between the USB port 120 and the central processing unit 140 when the USB device 210 is connected to the USB port 120 of the electronic device 100 and the multiplex control unit 160 is in the first usage mode, thereby allowing data to be transmitted between the central processing unit 140 and the USB device 210 by the first transmission path. For instance, the central processing unit 140 of the electronic device 100 reads from, writes into and/or deletes, by the first transmission path, data stored in the USB device 210. Furthermore, the central processing unit 140 of the electronic device 100 copies data stored in the USB device 210 to the electronic device 100 and copies data stored in the electronic device 100 to the USB device 210.

In another embodiment, the USB device 210 is a peripheral input device, such as a mouse and a keyboard. The multiplex control unit 160 creates the first transmission path between the USB port 120 and the central processing unit 140 when the USB device 210 is connected to the USB port 120 of the electronic device 100 and the multiplex control unit 160 is in the first usage mode so that the USB device 210 sends to the central processing unit 140 of the electronic device 100 by the first transmission path an input signal generated in accordance with the user's action, thereby allowing the central processing unit 140 to exercise related control according to the input signal.

Figure 4:
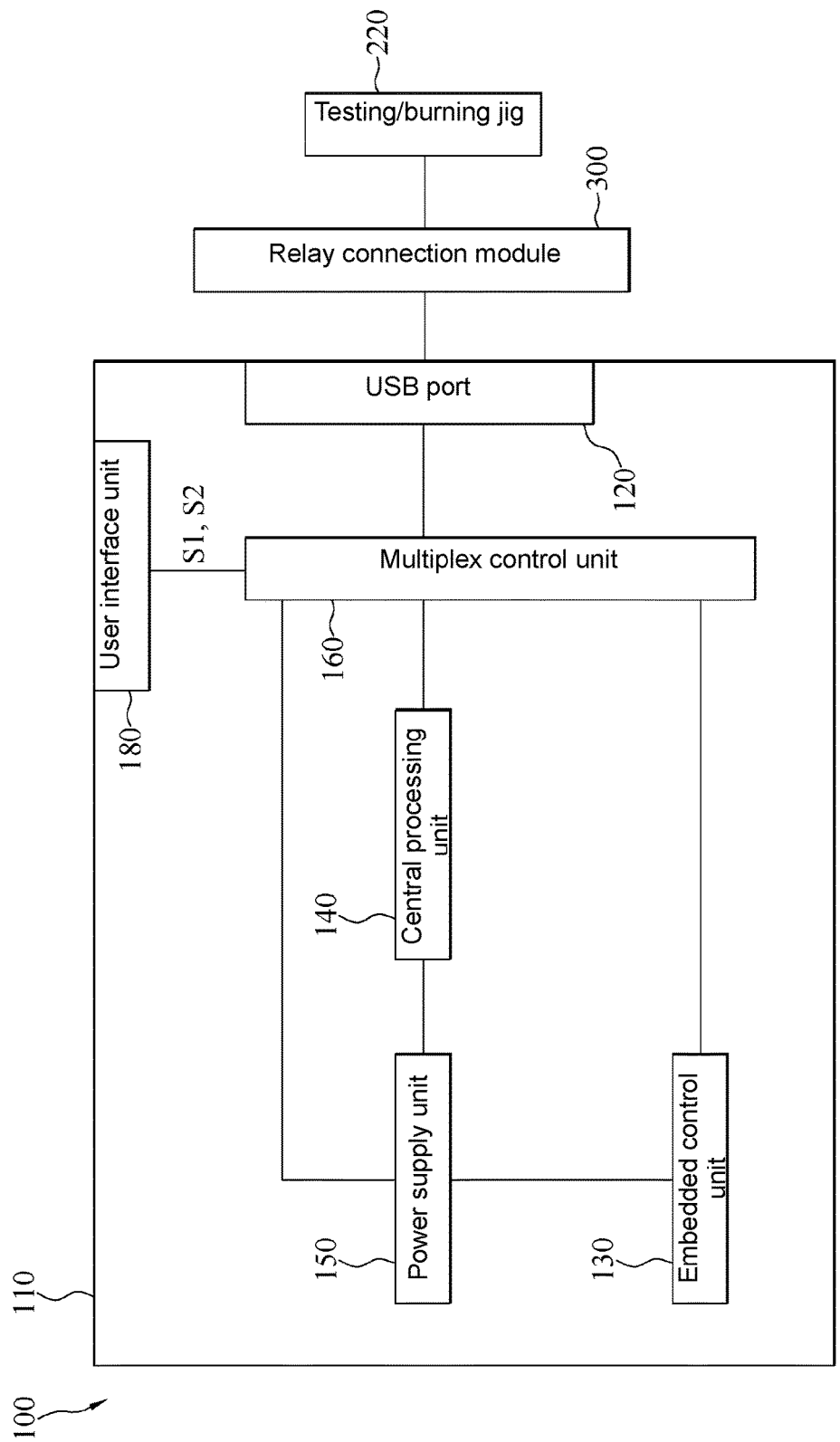
FIG. 4 is a block diagram of the USB port shown in FIG. 1 and adapted to serve as a port for use in a debug/programming test according to an embodiment of the present invention.

FIG. 4 is a block diagram of the USB port shown in FIG. 1 and adapted to serve as a port for use in a debug/programming test according to an embodiment of the present invention. Referring to FIG. 4, for instance, in an embodiment, the external device 200 is a testing/burning jig 220. The multiplex control unit 160 creates the second transmission path between the USB port 120 and the embedded control unit 130 when the testing/burning jig 220 is connected to the USB port 120 of the electronic device 100 and the multiplex control unit 160 is in the second usage mode. The testing/burning jig 220 sends a test signal to the embedded control unit 130 by the second transmission path and reads a result signal returned by the embedded control unit 130, so as to perform a debug test. The testing/burning jig 220 performs re-programming on the embedded control unit 130 by the second transmission path or directly burns a new program into the embedded control unit 130.

In some embodiments, the electronic device 100 has therein a test circuit. Therefore, the testing/burning jig 220 receives the result signal from the embedded control unit 130 by the second transmission path, when the testing/burning jig 220 is connected to the USB port 120 of the electronic device 100 and the multiplex control unit 160 is in the second usage mode and thus creates the second transmission path between the USB port 120 and the embedded control unit 130, but the present invention is not limited thereto.

In some embodiments, the port of the testing/burning jig 220 is directly connected to the USB port 120 of the electronic device 100, when the type of a port of the testing/burning jig 220 matches the type of the USB port 120 of the electronic device 100, but the present invention is not limited thereto. In some other embodiments, the testing/burning jig 220 becomes connected to the USB port 120 of the electronic device 100 by an interface change of a relay connection module 300, when the type of the port of the testing/burning jig 220 does not match the type of the USB port 120 of the electronic device 100, for example, when the port of the testing/burning jig 220 is a faller or a flexible flat cable.

In an embodiment, the testing/burning jig 220 supplies power to the user interface unit 180 through the USB port 120, when the electronic device 100 is in the OFF state and the testing/burning jig 220 is connected to the USB port 120 of the electronic device 100. Therefore, when the electronic device 100 is in the OFF state, the user interface unit 180 still generates the switch signal S1 according to the user's input to cause the electronic device 100 to switch to the second usage mode.

Figure 5:
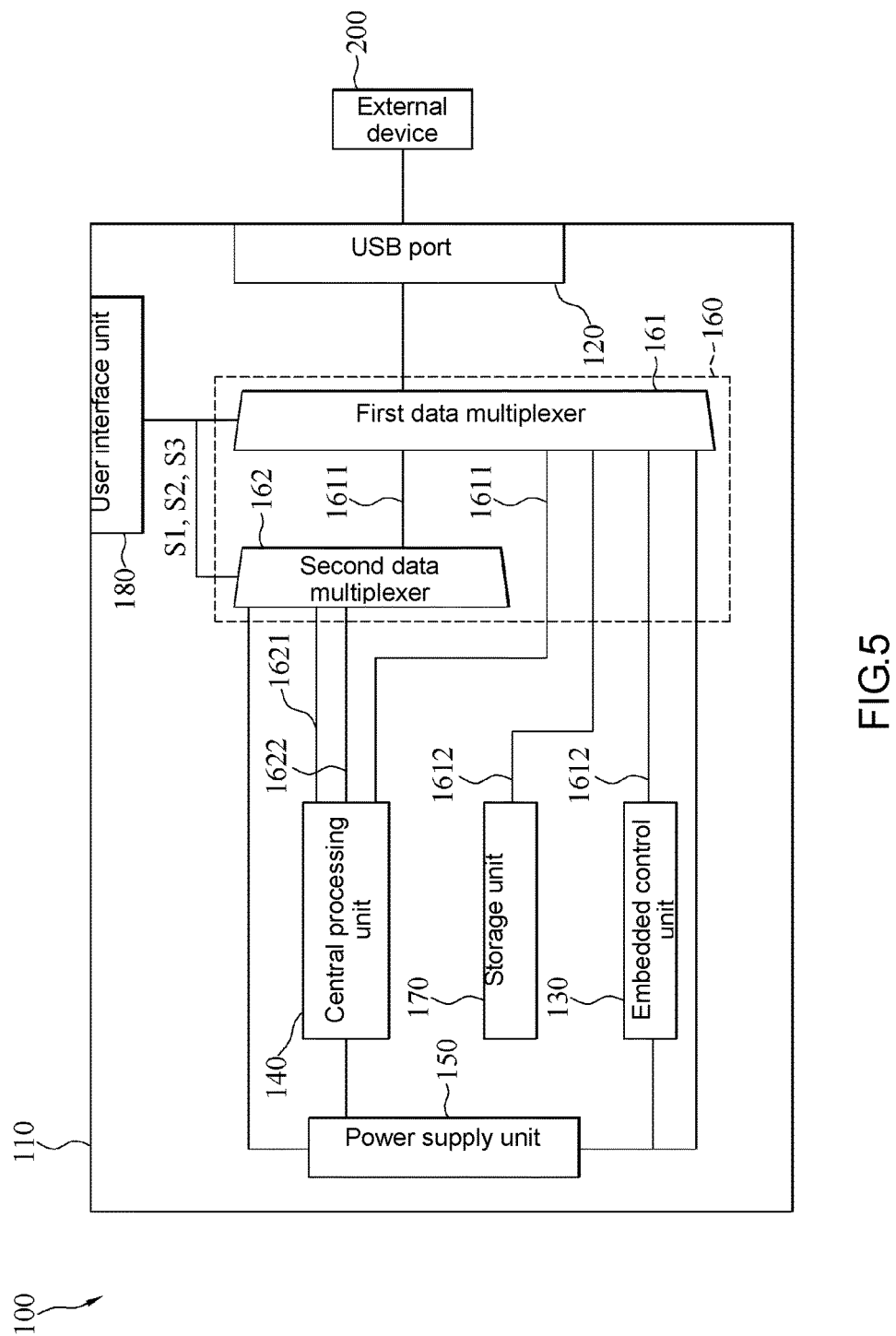
FIG. 5 is a block diagram of the electronic device according to a second embodiment of the present invention.
Figure 6:
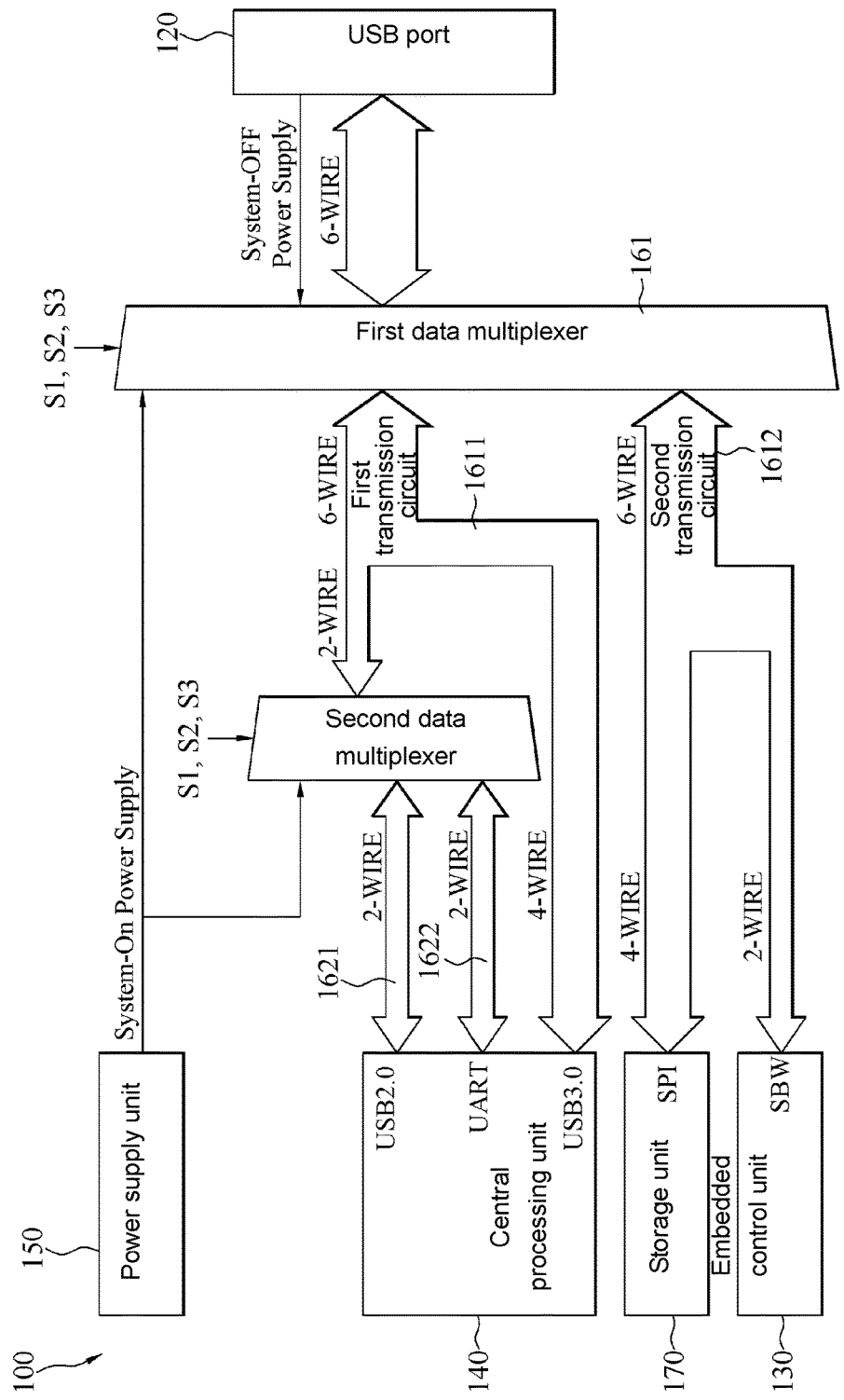
FIG. 6 is a block diagram of the electronic device shown in FIG. 5 according to an embodiment of the present invention.
Figure 7:
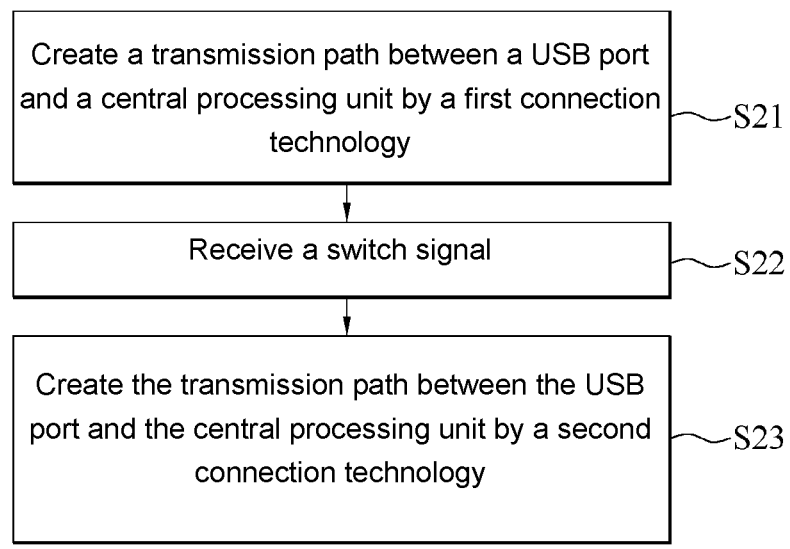
FIG. 7 is a schematic view of the process flow of the communication method according to another embodiment of the present invention.

FIG. 5 is a block diagram of the electronic device according to a second embodiment of the present invention. FIG. 6 is a block diagram of the electronic device shown in FIG. 5 according to an embodiment of the present invention. FIG. 7 is a schematic view of the process flow of the communication method according to another embodiment of the present invention. Referring to FIG. 5 through FIG. 7, in an embodiment, the multiplex control unit 160 comprises at least two data multiplexers, MUX for short, (hereinafter referred to as a first data multiplexer 161 and a second data multiplexer 162.) The electronic device 100 further comprises a storage unit 170. The first data multiplexer 161 is coupled to the USB port 120, central processing unit 140, power supply unit 150, second data multiplexer 162, storage unit 170 and user interface unit 180. The second data multiplexer 162 is coupled to the central processing unit 140, power supply unit 150 and user interface unit 180.

In an embodiment, the first data multiplexer 161 has two transmission circuits 1611, 1612 each composed of six wires. In some embodiments, four of the wires of a first transmission circuit 1611 of the first data multiplexer 161 are connected to the central processing unit 140, whereas the other two wires are connected to the second data multiplexer 162. Two of the wires of a second transmission circuit 1612 of the first data multiplexer 161 are connected to the embedded control unit 130, whereas the other four wires are connected to the storage unit 170.

In some embodiments, four of the wires of the first transmission circuit 1611 of the first data multiplexer 161 are connected to the central processing unit 140 by USB 3.0 connection technology. Two of the wires of the second transmission circuit 1612 of the first data multiplexer 161 are connected to the embedded control unit 130 by JTAG (also known as Spy-Bi-wire, SBW) connection technology, whereas the other four wires of the second transmission circuit 1612 are connected to the storage unit 170 by Series Peripheral Interface (SPI) technology.

The second data multiplexer 162 has two transmission circuits 1621, 1622 each composed of two wires. The wires of a first transmission circuit 1621 and the wires of a second transmission circuit 1622 are connected to the central processing unit 140.

In some embodiments, the first transmission circuit 1621 of the second data multiplexer 162 is connected to the central processing unit 140 by a first connection technology, such as USB 2.0 connection interface, whereas the second transmission circuit 1622 of the second data multiplexer 162 is connected to the central processing unit 140 by a second connection technology, such as Universal Asynchronous Receiver/Transmitter (UART) connection technology.

In an embodiment, the first data multiplexer 161 starts the first transmission circuit 1611, and the second data multiplexer 162 starts the first transmission circuit 1621, when the multiplex control unit 160 is in the first usage mode during the ON state, so that the external device 200 connected to the USB port 120 is connected to the USB 3.0 connection interface of the central processing unit 140 by the first data multiplexer 161 and connected to the USB 2.0 connection interface of the central processing unit 140 by the second data multiplexer 162. Therefore, the first transmission path created by the multiplex control unit 160 in the first usage mode comprises the first transmission circuit 1611 of the first data multiplexer 161 and the first transmission circuit 1621 of the second data multiplexer 162, wherein the USB port 120 uses a universal serial bus (USB) interface to perform data transmission (step S21).

When the multiplex control unit 160 is in the second usage mode during the OFF state, the first data multiplexer 161 starts the second transmission circuit 1612, but the second data multiplexer 162 does not start any one of the transmission circuits, so that the external device 200 connected to the USB port 120 becomes connected to the SBW connection interface of the embedded control unit 130 and the SPI connection interface of the storage unit 170 by the first data multiplexer 161. Therefore, the second transmission path created by the multiplex control unit 160 in the second usage mode comprises the second transmission circuit 1612 of the first data multiplexer 161. At this point in time, in the OFF state, the external device 200 not only communicates with the embedded control unit 130 through the USB port 120 and the SBW connection interface created by the embedded control unit 130, but also communicates with the storage unit 170 through the USB port 120 and the SPI connection interface created by the storage unit 170.

In an embodiment, the multiplex control unit 160 further comprises a third usage mode and switches to the third usage mode according to a switch signal S3 generated from the user interface unit 180 (step S22).

In the third usage mode, the multiplex control unit 160 creates a third transmission path between the central processing unit 140 and the USB port 120 so that, by being connected to the USB port 120, the external device 200 undergoes unidirectional or bidirectional communication with the central processing unit 140 by the third transmission path. In this regard, the USB port 120 serves as a port for use in a debug/programming test.

The first data multiplexer 161 starts the first transmission circuit 1611, and the second data multiplexer 162 starts the second transmission circuit 1622, when the multiplex control unit 160 is in the third usage mode during the ON state, so that the external device 200 connected to the USB port 120 is connected to the USB 3.0 connection interface of the central processing unit 140 by the first data multiplexer 161 and connected to the UART connection interface of the central processing unit 140 by the second data multiplexer 162. Therefore, the third transmission path created by the multiplex control unit 160 in the third usage mode comprises the first transmission circuit 1611 of the first data multiplexer 161 and the second transmission circuit 1622 of the second data multiplexer 162, whereas the USB 3.0 connection interface and the UART connection interface, which are created by the external device 200 through the USB port 120 and the central processing unit 140, communicate with the central processing unit 140 (step S23).

In an embodiment, the first data multiplexer 161 of the multiplex control unit 160 is powered by the power supply unit 150 or powered by the external device 200 through the USB port 120, whereas the second data multiplexer 162 of the multiplex control unit 160 is powered by the power supply unit 150. Therefore, the first usage mode and the third usage mode of the multiplex control unit 160 are available only when the electronic device 100 is in the ON state, whereas the second usage mode of the multiplex control unit 160 is available only when the electronic device 100 is in the ON state or the OFF state. However, the second usage mode of the multiplex control unit 160 is available only when the electronic device 100 is in the OFF state in order to prevent the user from performing, while the electronic device 100 is in the ON state, a wrong switch which otherwise prevents the USB port 120 from serving as a general, universal port.

In some embodiments, the multiplex control unit 160 is a multiplex controller (MUX). The storage unit 170 is provided in the form of one or more storage components. Each storage component is a non-volatile memory, such as ready-only memory (ROM) and flash memory, or a volatile memory, such as random access memory (RAM), but the present invention is not limited thereto.

In some embodiments, the storage unit 170 is a storage component inside the central processing unit 140, but the present invention is not limited thereto. In some other embodiments, the storage unit 170 is an external storage component independent of the central processing unit 140.

In conclusion, an electronic device and a communication method thereof according to embodiments of the present invention involve using a multiplex control unit to switch between transmission paths of a USB port so that researchers directly connect an external device to the electronic device to perform a debug/programming test on an embedded control unit and/or a central processing unit in conjunction with the USB port for use with external transmission data so that programming design, maintenance, service and analysis of the electronic device are carried out quickly, conveniently, and reliably.

Although the present invention is disclosed above by preferred embodiments, the preferred embodiments are not restrictive of the present invention. Changes and modifications made by persons skilled in the art to the preferred embodiments without departing from the spirit of the present invention must be deemed falling within the scope of the present invention. Accordingly, the legal protection for the present invention should be defined by the appended claims.

What is claimed is:

1. An electronic device, comprising:
    a case;
    a port disposed at the case;
    an embedded control unit disposed in the case;
    a central processing unit disposed in the case;
    a power supply unit disposed in the case; and
    a multiplex control unit disposed in the case, having a first usage mode and a second usage mode, being normally in the first usage mode, switching to the second usage mode upon receipt of a switch signal, being powered by the power supply unit and creating a first transmission path between the central processing unit and the port while being in the first usage mode, being powered by an external device connected to the USB port and creating a second transmission path between the embedded control unit and the port while being in the second usage mode.

2. The electronic device of claim 1, wherein the power supply unit supplies power to the multiplex control unit, the port, the embedded control unit and the central processing unit during an ON state of the electronic device, and does not supply power to the port, the central processing unit and the multiplex control unit during the OFF state of the electronic device.

3. The electronic device of claim 1, further comprising a user interface unit disposed at the case and adapted to generate the switch signal, wherein the user interface unit receives power from the external device when the electronic device is in the OFF state and the external device is connected to the port.

4. The electronic device of claim 1, further comprising a USB port disposed at the case and adapted to connect with an input device which generates the switch signal.

5. The electronic device of claim 1, wherein the port requires a USB 3.0 connection interface.

6. The electronic device of claim 1, wherein the embedded control unit is connected to the multiplex control unit by Joint Test Action Group (JTAG) connection technology.

7. The electronic device of claim 1, wherein an external device connected to the port communicates with the central processing unit by the first transmission path in the first usage mode and communicates with the embedded control unit by the second transmission path in the second usage mode.

8. The electronic device of claim 1, wherein the multiplex control unit switches to the second usage mode only when the electronic device is in an OFF state when the switch signal is received.

9. A communication method applicable to an electronic device, the communication method comprising the steps of:
connecting a port of the electronic device to an external device when the electronic device is in an OFF state;
receiving by a multiplex control unit of the electronic device power from the external device through the port;
receiving of a switch signal by the multiplex control unit while being supplied with power by the external device; and
creating a transmission path between the port and an embedded control unit by the multiplex control unit only on receipt of the switch signal while being supplied with power by the external device and the electronic device being in the OFF state.

10. A communication method applicable to an electronic device, the communication method comprising the steps of:
connecting a first data multiplexer of the electronic device to a second data multiplexer, followed by creating a transmission path between a port of the electronic device and a central processing unit with the second data multiplexer by a first connection technology; and
creating the transmission path between the port and the central processing unit with the second data multiplexer by a second connection technology according to a switch signal, wherein the second connection technology differs from the first connection technology in a form.

11. The communication method of claim 10, wherein the first data multiplexer and the second data multiplexer together comprise a multiplex control unit, the multiplex control unit having a first usage mode and a second usage mode, further comprising the steps of:
entering the first usage mode while the electronic device is in an ON state, wherein the power supply unit supplies power to the first data multiplexer and the second data multiplexer in the first usage mode, and the transmission path between the central processing unit and the port by the first connection technology is created in the first usage mode;
powering OFF the electronic device;
switching to the second usage mode upon receipt of the switch signal by the multiplex control unit while the electronic device is in the OFF state, wherein first data multiplexer is powered by an external device connected to the port in the second usage mode, the second data multiplexer is not powered in the second usage mode, and the transmission path between the central processing unit and the port by the second connection technology is created in the second usage mode.

* * * * *